(12) United States Patent
Allen et al.

(10) Patent No.: US 8,375,162 B2
(45) Date of Patent: Feb. 12, 2013

(54) METHOD AND APPARATUS FOR REDUCING WRITE CYCLES IN NAND-BASED FLASH MEMORY DEVICES

(75) Inventors: William J. Allen, Cupertino, CA (US); Franz Michael Schuette, Colorado Springs, CO (US)

(73) Assignee: OCZ Technology Group Inc., San JOse, CA (US)

(*) Notice: Subject to any disclaimer, the term of this patent is extended or adjusted under 35 U.S.C. 154(b) by 323 days.

(21) Appl. No.: 12/793,023

(22) Filed: Jun. 3, 2010

(65) Prior Publication Data

US 2010/0312953 A1   Dec. 9, 2010

Related U.S. Application Data

(60) Provisional application No. 61/183,754, filed on Jun. 3, 2009.

(51) Int. Cl.
*G06F 12/00* (2006.01)
(52) U.S. Cl. ........................................ 711/103
(58) Field of Classification Search .............. None
See application file for complete search history.

(56) References Cited

U.S. PATENT DOCUMENTS

| | | | |
|---|---|---|---|
| 7,734,865 B2 * | 6/2010 | Tanaka et al. | 711/103 |
| 7,761,655 B2 * | 7/2010 | Mizushima et al. | 711/103 |
| 7,818,525 B1 * | 10/2010 | Frost et al. | 711/165 |
| 2008/0288713 A1 | 11/2008 | Lee et al. | |
| 2010/0100667 A1 * | 4/2010 | Kang et al. | 711/103 |
| 2011/0022784 A1 * | 1/2011 | Yano et al. | 711/103 |

* cited by examiner

*Primary Examiner* — Hiep Nguyen
(74) *Attorney, Agent, or Firm* — Hartman Global IP Law; Gary M. Hartman; Domenica N. S. Hartman

(57) ABSTRACT

A NAND-based flash memory device and a method of its operation that extends the life of the device by reducing the number of unnecessary write cycles to the device. The memory device includes blocks, pages contained by each of the blocks, and a page abstraction layer containing a look-up table for translating logical page numbers into physical page numbers. A certain number of the pages in at least one of the blocks is preferably reserved so as not to be used in default data storage mode but instead used to shuffle data within the at least one block using a dynamic page address scheme, whereby data are dynamically moved from one page to an empty page in the same block using dynamic page mapping.

13 Claims, 3 Drawing Sheets

ND APPARATUS FOR REDUCING
METHOD AND APPARATUS FOR REDUCING WRITE CYCLES IN NAND-BASED FLASH MEMORY DEVICES

CROSS REFERENCE TO RELATED APPLICATIONS

This application claims the benefit of U.S. Provisional Application No. 61/183,754, filed Jun. 3, 2009, the contents of which are incorporated herein by reference.

BACKGROUND OF THE INVENTION

The present invention generally relates to memory devices, and more particularly to a technique for extending the life of a NAND-based flash memory device by reducing the number of unnecessary write cycles to the device.

Solid state drives comprising NAND-based flash memory are rapidly evolving to become the non-volatile memory of choice in desktop and high-performance computing. Despite the advantage in access time over non-volatile memory as it is used in the case of rotatable media such as hard disk drives, a notable disadvantage of NAND flash memory is that data cannot be simply overwritten. This limitation of flash memory is caused by the fact that individual bits can only be altered from 1 to 0 but not vice-versa. Consequently, before any rewriting of data, the entire content of a page must be erased by programming all cells to 1. In addition, pages within a block of NAND flash memory are statically mapped, that is, each page within a block has a unique address that cannot be changed. If data are written to NAND flash memory, they are typically written over multiples of physical blocks using the same page address in each block. If any page must be updated, it must be written to the same page address but the fact that it is impossible to overwrite the existing page means that it must be written to a different block and subsequently, the logical to physical block mapping must be updated. The change in logical block mapping, in turn, means that all contents within the block that was altered must be moved to the new block corresponding to the logical block address.

In a scenario like that described above, the consequence is that the write efficiency is extremely low for small files. For example, in typical architectures employing 128 pages of 4 KB in each block, rewriting a single 4 KB file fragment requires the re-writing of all 128 pages within the block, depending on how many pages in the respective block contain data. If a target block previously contained data, the block must first be erased prior to the re-writing operation. Consequently, rewriting 128 files of 4KB file fragments can require up to 128 erase and write cycles for each single file instead of a single file update.

Every programming cycle of NAND flash memory entails the injection of electrons into the floating gate through quantum-mechanical tunneling through the tunneling oxide of the NAND cell. Likewise, every erase cycle entails the removal of electrons from the floating gate through tunneling in the reverse direction. Over time, the tunneling oxide degrades and exhibits broken atomic bonds that can trap electrons. As a result, the tunnel oxide becomes electrically negative, causing a shift in programming/erase speed in which the programming operation becomes faster whereas the erasing operation becomes slower. Because of this build up of charge as a factor of the number of erase/write cycles, the number of cycles for each NAND cell is finite and, consequently, the number of cycles (endurance) of a NAND flash memory device is also finite.

The problem arising from the static mapping of pages within a NAND block is well documented and several ways have been proposed to alleviate the issue. Primarily, these issues include intelligent management of data to keep the number of program cycles to a minimum, with the view "that the best write is the one that does not happen." In other words, valid strategies are that intermediate data and meta-data referring to the actual data are typically processed on the level of the system memory, and the final data are then sent to the drive where they are cached in the drive's cache or buffer. Once the data in the buffer reach a certain size, they are combined to a logically coherent set of data and then written in one sweep to the flash memory array, typically using all channels available. This type of write-combining eliminates a large part of small random writes, but it is only one step to better management of NAND flash memory blocks. Another strategy uses a RAM-disk wherein all data are exclusively written to memory and only on system shut-off are committed to a NAND flash-based solid state drive. Those optimizations are primarily implemented on the level of the operating system or on the drive architecture/firmware.

U.S. Patent Application Publication No 2008/0288713 to Lee et al. discloses a somewhat different approach by copying heavily accessed data to a separate volatile memory which uses dynamic page mapping, and only the final data are committed to a NAND flash memory. This type of approach is optimized on the basis of temporal locality for data base management systems. None of the mentioned approaches, however, addresses the fundamental issue arising from the static page mapping of NAND blocks.

In view of the above, it can be appreciated that an ongoing limitation of NAND-based flash memory is that individual memory cells cannot be rewritten and, because of static page mapping, single page updates require an entire block featuring the modified page to be rewritten to an empty block. In view of their finite number of cycles, there is an ongoing desire to minimize the number of program cycles of NAND flash memory devices.

BRIEF DESCRIPTION OF THE INVENTION

The present invention provides a NAND-based flash memory device and a method of its operation that extends the life of the device by reducing the number of unnecessary write cycles to the device.

According to a first aspect of the invention, a NAND flash memory device includes blocks, pages contained by each of the blocks, and a page abstraction layer containing a look-up table for translating logical page numbers into physical page numbers. According to a preferred aspect of the invention, a certain number of the pages in at least one of the blocks is reserved so as not to be used in default data storage mode but instead used to shuffle data within the at least one block using a dynamic page address scheme. All or a fraction of the pages of the blocks may be dynamically mapped.

According to a second aspect of the invention, a method of operating the NAND flash memory device includes translating logical page numbers into physical page numbers with the look-up table. According to a preferred aspect of the invention, data are dynamically moved from one page to an empty page in the same block using dynamic page mapping. Furthermore, a certain number of the pages in at least one of the blocks may be reserved so as not to allow their use in a default data storage mode. Instead, the reserved pages are used to shuffle data within the at least one block using a dynamic page address scheme.

In view of the above, the invention is able to reduce the number of unnecessary write cycles to a NAND-based flash memory device by using a page-based solution in which data are dynamically moved from one page to an empty page in the same block using dynamic page mapping. More particularly, dynamic page mapping on a block basis allows for the migration of data within a block without writing the entire content of the block to another block using the same page numbers, thereby eliminating the complete copying of a block regardless of contents. In the case of a single 4 KB file, this capability can reduce the number of erase/write cycles by as much as the number of pages within the block, which would dramatically increase the endurance of a NAND-based flash memory IC. In addition to reducing write cycles, particular but nonlimiting advantages of this approach include more efficient block use and the ability to automatically schedule the erasing of "dirty" blocks, which in this context means a block containing data that are no longer valid and need to be erased before the block can be rewritten.

Other aspects and advantages of this invention will be better appreciated from the following detailed description.

DETAILED DESCRIPTION OF THE INVENTION

The present invention is intended to extend the life of a NAND-based flash memory device by reducing the number of unnecessary write cycles to the device. The technique entails reserving a certain number of pages in each block of the flash memory device. The reserved pages are not allowed to be used in default data storage mode, but instead are used for shuffling contents within a block using a dynamic page address scheme. If a file is updated, the updated data are remapped to the next page (or pages) within the same block and the page number carried over accordingly. This requires a dynamic page mapping scheme that includes logical page addresses in addition to physical page addresses. The block management unit serves as a table of contents and also keeps track of the obsolescence or life state of pages within the block. Therefore, whenever the block is filled, including the presence of dirty pages, only valid pages are copied over to an alternate block. This results in a much lower number of written pages than if all pages, including no longer valid entries, are copied. Alternatively, all pages within a block could be dynamically mapped, and only when no empty pages are left within a block will the valid data be copied over to an alternate block. Also in this case, only the last copy of any stored data will be recognized as valid on the basis of block management and moved along with the update to the next block.

Figure 1:
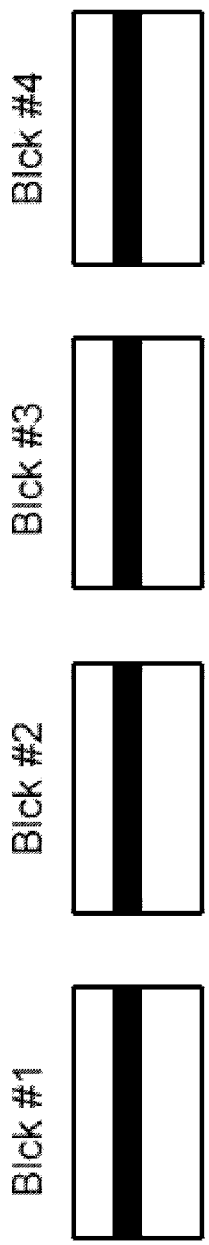
FIGS. 1 and 2 represent the typical pattern of data writes into a series of four blocks of a NAND-based flash memory device in accordance with the prior art.
Figure 2:
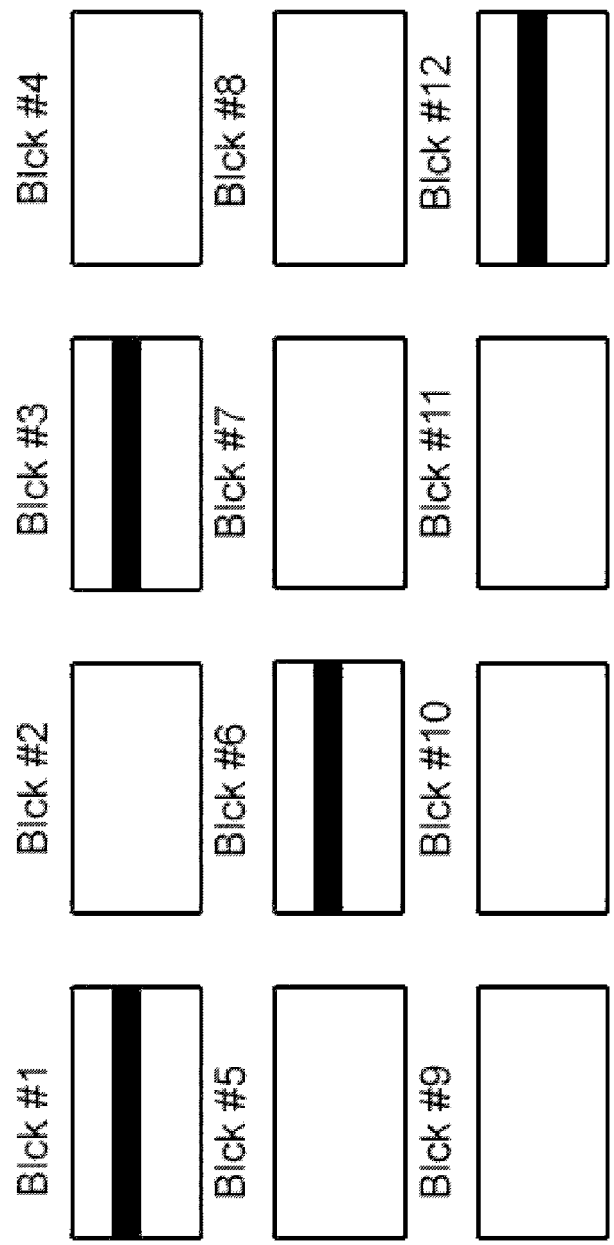

As background, FIGS. 1 and 2 schematically represent the typical pattern of data writes into a series of four blocks. In each block, the same page numbers are used in accordance with prior art practice. FIG. 1 shows the distribution of written data in four blocks (Blocks #1 to #4) of a previously empty flash memory drive. FIG. 2 shows a pattern in a drive using load distribution or wear leveling where physically non-coherent blocks (Blocks #1, #3, #6 and #12) have been mapped to a logically contiguous set of blocks.

Figure 3:
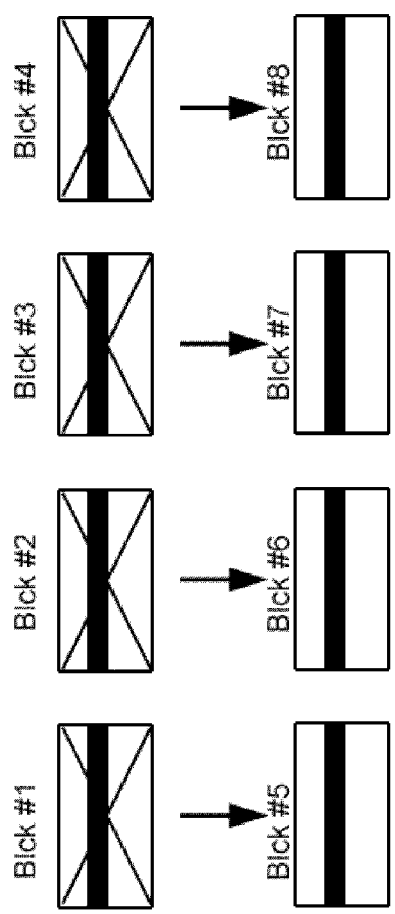
FIG. 3 shows a file fragment update according to existing art wherein entire pages are rewritten to corresponding pages with the same physical page number in empty blocks while the original blocks are marked as dirty.
Figure 4:
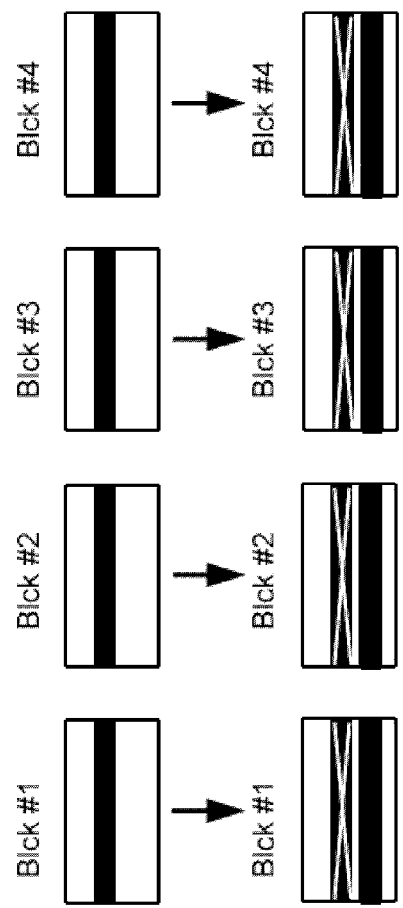
FIG. 4 represents the writing of updated data to the next available set of pages within the same set of blocks while the older pages are marked as dirty, in accordance with a preferred aspect of the invention.
Figure 6:
FIGS. 5 and 6 represent a comparison of existing writing technique using static page numbers and the dynamic page mapping technique of this invention, the latter of which entails supplying a logical address that is remapped onto any available physical address using a look-up table.
Figure 5:
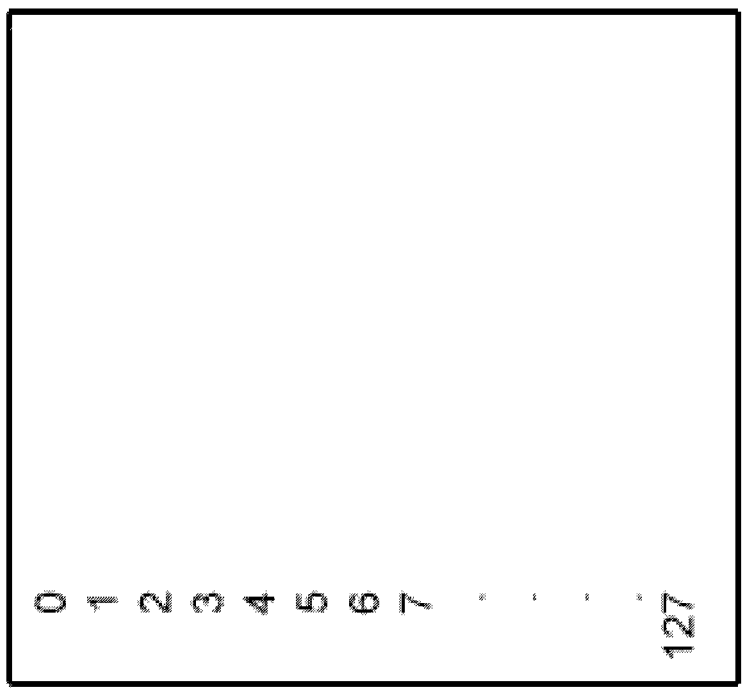

FIGS. 3 and 4 represent a comparison between existing art practice using static page addresses and the page remapping of this invention. FIG. 3 (prior art) represents the pattern of a file fragment update in which all data from four logically coherent blocks (Blocks #1 to #4) are rewritten to the same page numbers in the next available set of blocks (Blocks #5 to #8) while the original blocks are marked as dirty (with an X through them). In FIG. 4, updated data are being written to the next available set of pages within the same blocks while the older pages are marked as dirty. FIGS. 5 and 6 represent a comparison of the existing prior art practice of using static page numbers to the dynamic page mapping technique of this invention, in which a logical page address is supplied and remapped onto any available physical page address using a look-up table that is contained by a page abstraction layer of the blocks and that is used to translate logical page numbers into physical page numbers.

The present invention illustrated in FIGS. 4 and 6 is able to increase the endurance of a NAND flash memory device by reducing the number of erase and program cycles. FIG. 6 represents the page management in each block as featuring dynamically mapped pages, that is, instead of having fixed page numbers, e.g., from 0 to 127, the page numbering is dynamic in that a logical to physical page mapping is done on a per block basis. Each block features a page abstraction layer containing a look-up table that keeps track of the logical to physical mapping of pages. If a page is rewritten, its updated contents are copied to a second page in the same block, and the original page is flagged as invalid and dirty. Simultaneously, the look-up table is updated to reflect the remapping. If the block fills up with dirty pages, valid pages within the block are consolidated and written to a new block, whereas the dirty pages are ignored. Simultaneously, the entire block is flagged as invalid and scheduled for proactive erase during a subsequent idle period.

The dynamic remapping of the pages reduces the need to rewrite entire blocks of data as a means of updating a single file fragment and then change the logical to physical mapping of the block. Depending on the number of pages already written within a block, this method dramatically reduces the necessary number of writes as compared to the currently-used method of static page mapping represented in FIG. 5.

In an alternative embodiment of the invention, only a fraction of the pages may be dynamically mapped. This has the effect of reducing the size of the look-up table, which is typically a content-addressable memory in which a virtual page number is given and the physical address is generated according to the match. In this case, the majority of pages (for example 112 pages) maintains a static addressing scheme in conjunction with a single-bit register entry that indicates whether the page contains an original write or needs to be disregarded in favor of the alternative entry in one of the sixteen remaining dynamically mapped pages.

In currently-used NAND addressing schemes of the prior art, data are typically written over n blocks, where n equals the number of channels supported by the controller. In this case, the individual data fragments use the same page number within each block. This also means that the availability of blocks for writing data becomes a matter of the availability of that specific page number within the block. That is, if the specific page number desired and available in some blocks is already occupied in a presumed target block, a different physical block needs to be used and then mapped as a logical block. The inherent drawback of this prior art scheme is poor utilization of existing blocks because, in order to write the individual data fragments, the same individual page address must be available in all blocks. While this does not constitute a problem in any empty drive (FIG. 1), as the drive fills up there will be fewer and fewer identical page addresses that remain usable across all target blocks for a write operation (FIG. 2). In contrast, by using the dynamic page mapping technique of this invention, the problem just described can be greatly reduced in that the physical page address is no longer a limitation for the availability of a block. As a result, utilization of physical blocks can be increased by sequentially using all free pages instead of rewriting partially filled blocks to the same page addresses of new blocks.

While the invention has been described in terms of specific embodiments, it is apparent that other forms could be adopted by one skilled in the art. Therefore, the scope of the invention is to be limited only by the following claims.

The invention claimed is:

1. A NAND-based flash memory device comprising blocks, pages contained by each of the blocks, and a page abstraction layer containing a look-up table for translating logical page numbers into physical page numbers, wherein a certain number of the pages in at least one of the blocks is reserved so as not to be used in default data storage mode but instead used to shuffle data within the at least one block using a dynamic page address scheme.

2. A NAND-based flash memory device comprising blocks, pages contained by each of the blocks, and a page abstraction layer containing a look-up table for translating logical page numbers into physical page numbers, wherein all of the pages of the blocks are dynamically mapped.

3. A NAND-based flash memory device comprising blocks, pages contained by each of the blocks, and a page abstraction layer containing a look-up table for translating logical page numbers into physical page numbers, wherein a fraction of the pages of the blocks is dynamically mapped.

4. The NAND-based flash memory device of claim 3, wherein a register entry defines whether a page is an original page or has been invalidated by a subsequent write to a dynamically mapped page.

5. A method of operating a NAND-based flash memory device comprising blocks, pages contained by each of the blocks, and a page abstraction layer containing a look-up table for translating logical page numbers into physical page numbers, the method comprising translating logical page numbers into physical page numbers with the look-up table, wherein data are dynamically moved from one page to an empty page in the same block using dynamic page mapping.

6. A method of operating a NAND-based flash memory device comprising blocks, pages contained by each of the blocks, and a page abstraction layer containing a look-up table for translating logical page numbers into physical page numbers, the method comprising:
   translating logical page numbers into physical page numbers with the look-up table,
   reserving a certain number of the pages in at least one of the blocks,
   not allowing the reserved pages to be used in default data storage mode, and
   using the reserved pages to shuffle data within the at least one block using a dynamic page address scheme.

7. The method of claim 6, further comprising the step of updating data within a first page of the at least one block by remapping the updated data to at least a next page within the at least one block and carrying over the page number of the first page to the next page.

8. The method of claim 7, further comprising the step of flagging the first page as invalid and dirty.

9. The method of claim 7, further comprising the step of updating the look-up table to reflect the remapping step.

10. The method of claim 8, further comprising the step of consolidating and writing valid pages within the at least one block to a new block, while ignoring the dirty pages of the at least one block.

11. The method of claim 10, further comprising the steps of flagging the at least one block as invalid in its entirety, and scheduling a proactive erase of the at least one block during a subsequent idle period of the device.

12. A method of operating a NAND-based flash memory device comprising blocks, pages contained by each of the blocks, and a page abstraction layer containing a look-up table for translating logical page numbers into physical page numbers, the method comprising:
   translating logical page numbers into physical page numbers with the look-up table, and
   dynamically mapping all of the pages of the blocks.

13. A method of operating a NAND-based flash memory device comprising blocks, pages contained by each of the blocks, and a page abstraction layer containing a look-up table for translating logical page numbers into physical page numbers, the method comprising:
   translating logical page numbers into physical page numbers with the look-up table, and dynamically mapping a fraction of the pages of the blocks.

* * * * *